United States Patent
Heffel (10) Patent No.: US 11,674,693 B2
(45) Date of Patent: Jun. 13, 2023

(54) DEVICE FOR CLEANING, STORING OR COOKING OBJECTS

(71) Applicant: Accuride International GmbH, Diez (DE)

(72) Inventor: Andreas Heffel, Bendorf (DE)

(73) Assignee: Accuride International GmbH, Diez (DE)

( * ) Notice: Subject to any disclaimer, the term of this patent is extended or adjusted under 35 U.S.C. 154(b) by 324 days.

(21) Appl. No.: 17/014,000

(22) Filed: Sep. 8, 2020

(65) Prior Publication Data

US 2021/0071876 A1    Mar. 11, 2021

(30) Foreign Application Priority Data

Sep. 9, 2019  (DE) ...................... 10 2019 124 058.1

(51) Int. Cl.
*F24C 15/16* (2006.01)
*A47J 27/04* (2006.01)
(Continued)

(52) U.S. Cl.
CPC ............. *F24C 15/168* (2013.01); *A47J 27/04* (2013.01); *A47J 36/16* (2013.01);
(Continued)

(58) Field of Classification Search
CPC ......... F24C 15/168; F25D 25/02; A47J 27/04; A47J 36/16; A47J 2027/043; A47L 15/4248
(Continued)

(56) References Cited

U.S. PATENT DOCUMENTS 8,052,235 B2 * 11/2011 Kelly ................... F25D 17/042
 292/201
9,408,462 B1 * 8/2016 Hong ................... F24C 15/168
(Continued)

FOREIGN PATENT DOCUMENTS

DE   20 2006 020 236 U1   2/2008
DE   10 2016 103 155 A1   8/2017
(Continued)

OTHER PUBLICATIONS

Extended European search report from European patent application No. 20194544.1, dated Jan. 20, 2021.

*Primary Examiner* — James O Hansen
(74) *Attorney, Agent, or Firm* — Faegre Drinker Biddle & Reath LLP (57) ABSTRACT

An apparatus for cleaning, storing or cooking items includes a housing formed by walls enclosing an internal space; at least one support arrangement removable from the housing; and at least one locking unit arranged at the support arrangement. The support arrangement includes at least one rail system having at least two rails connected together and moveable relative to each other and at least one support element. The locking unit includes at least one locking element which can be transferred between a blocking position and a free position, wherein, when the support arrangement is mounted to the housing, the locking unit is in its free state in which the locking element enables extension of the rail system. When the support arrangement is separated from the housing, the locking unit is in its blocking state in which the locking element blocks extension of the rail system with the formation of a positively locking relationship.

15 Claims, 3 Drawing Sheets

(51) Int. Cl.
　　　*A47J 36/16*　　　(2006.01)
　　　*A47L 15/42*　　　(2006.01)
　　　*F25D 25/02*　　　(2006.01)

(52) U.S. Cl.
　　　CPC ..... *A47L 15/4248* (2013.01); *A47J 2027/043* (2013.01); *F25D 25/02* (2013.01)

(58) Field of Classification Search
　　　USPC .............................. 312/410; 126/337 R, 339
　　　See application file for complete search history.

(56) References Cited

U.S. PATENT DOCUMENTS

| | | | |
|---|---|---|---|
| 10,548,396 B1* | 2/2020 | Hong | A47B 88/43 |
| 2003/0234602 A1 | 12/2003 | Cutler et al. | |
| 2008/0036345 A1 | 2/2008 | Kropf et al. | |
| 2008/0143224 A1 | 6/2008 | Huang | |
| 2010/0018517 A1 | 1/2010 | Chen | |
| 2012/0138041 A1* | 6/2012 | Jahrling | F24C 15/168 126/339 |
| 2014/0231421 A1* | 8/2014 | Yang | F24C 15/168 219/763 |
| 2018/0313545 A1 | 11/2018 | Jeong et al. | |

FOREIGN PATENT DOCUMENTS

| | | |
|---|---|---|
| EP | 1 887 172 A2 | 2/2008 |
| EP | 2 767 763 A2 | 8/2014 |

* cited by examiner

State of the art

DEVICE FOR CLEANING, STORING OR COOKING OBJECTS

The priority application, German patent application no. 10 2019 124 058.1, filed on Sep. 9, 2019, is incorporated by reference herein in its entirety.

The invention concerns an apparatus in accordance with the classifying portion of claim 1.

The apparatus in accordance with the present application is suitable for cleaning, storing or cooking at least one item. A corresponding apparatus can be formed in particular by a refrigerator, an oven, a steam cooker or a dishwasher. The apparatus can be in particular in the form of a domestic built-in appliance or a commercially used apparatus.

The apparatus includes a housing which is formed by walls and by means of which an internal space is spatially enclosed. Taking the example of an oven the internal space is formed by a cooking chamber. In addition the respective apparatus includes at least one support arrangement which is removable from the housing and at least one locking unit arranged on the support arrangement. The support arrangement in turn includes at least one rail system and at least one support element. The rail system has at least two interconnected rails which are movable relative to each other. In particular it can be formed by a telescopic extension. The support element serves to carry at least one item. By way of example in the case of an apparatus in the form of a refrigerator the support element can be formed by a shelf or in the case of an apparatus for example in the form of an oven the support element can be formed by a grill or baking tray. The locking unit includes at least one locking element which can be transferred between a blocking position and a free position. In an installation state of the support arrangement in which the support arrangement is mounted to the housing the locking unit is in a free state, in which the locking element enables the rail system to be pulled out. In a removed state in contrast in which the support arrangement is separated from the housing the locking element is in a blocking state in which the locking element blocks extension of the rail system, by providing a positively locking relationship. In that way unintentional extension of the rail system, for example when removing the support arrangement from the domestic appliance or industrial apparatus, is prevented.

Usually the support arrangement is periodically removed from the housing, for example in the course of cleaning the support arrangement. In that case it can happen that a user of the apparatus moves and turns the support arrangement, that is to say orients it in opposite relationship to an orientation which applies in the installation state of the support arrangement in order thereby for example to be able to clean an underside of the support arrangement. It has been found however that the known apparatuses suffer from the problem that, in the situation where the rail system is moved and turned in the course of removal, the rails of the rail system are unintentionally pulled out. That can have the disadvantage that the user is impeded or even injured.

Accordingly the object of the present application is to provide an apparatus having an alternative locking element, the reliability of which is improved over the state of the art.

According to the invention the object of the invention is attained by means of an apparatus having the features of claim 1. Advantageous configurations are set forth in claims 2 to 15.

The apparatus according to the invention is characterised in that the locking unit has a setting element cooperating with the locking element, wherein the setting element is mounted to the support arrangement rotably about an axis of rotation so that it can be transferred between a rest position and a supporting position, wherein when in its supporting position the setting element is suitable for holding the locking element in the blocking position thereof against the action of the force of gravity.

The apparatus according to the invention has many advantages. In particular the locking element blocks extension of the rail system when the support arrangement is in its removed state and more specifically both when the support arrangement is in its orientation of use and also in a reversal orientation. In the orientation of use of the support arrangement the support element is provided to receive an item. In particular when the support arrangement is in its orientation of use the support element can be oriented horizontally as is usual for a baking tray, a shelf or a grill. The support arrangement is typically in its orientation of use in particular when in its installation state. When the support arrangement is in its orientation of use the rail system is blocked against being pulled out as is already known in the state of the art insofar as the support arrangement is in its removed state. In that case the locking element can be held in its blocking position in particular under the action of the force of gravity, in which case for example the locking element engages with a coupling element in positively locking relationship. In the reversal orientation of the support arrangement which is turned through 180° about a horizontal axis of rotation relative to the orientation of use the support arrangement is, as it were, "upside down". The apparatus according to the invention ensures that even in that scenario the rail system is blocked against unintentionally being pulled out.

In that respect there is basically the problem that the force of gravity actually "pulls" a movement of the locking element in a direction opposite to the orientation of use. The result of this can be that the locking element is unintentionally moved into its free position. Such a movement of the locking element is prevented by means of the setting element so that the locking element, in spite of the opposing action of the force of gravity, remains in its blocking position, more specifically even when the support arrangement is in its reversal orientation. That functionality of the setting system is achieved by means of the rotatability thereof on the support arrangement. In particular, as a consequence of a eccentric centre of gravity with respect to the associated axis of rotation, in the course of "turning over" the support arrangement, that is to say in the course of transferring it between its orientation of use and its reversal orientation, the setting element is rotated about the axis of rotation solely as a consequence of the action of the force of gravity as the force acting due to the weight involved produces a turning moment about the axis of rotation. The rotation which occurs in the course of transfer into the reversal orientation can be used to hold the locking element in the blocking position against the force acting thereon due to the weight involved, in which case for example at least a holding portion of the setting element is rotated "upwardly" against the direction in which the force of gravity acts. A corresponding configuration can also be found in the embodiment by way of example hereinafter. In that respect it is to be particularly preferred if, when in its rest position, the setting element enables transfer of the locking element between its free position and its blocking position.

It is preferably provided that the setting element assumes a rest position in the orientation of use of the support arrangement. The support element is provided to receive an item in the orientation of use. It is thus conceivable for example that, in the case of apparatus in the form an oven, the support element receives the food to be cooked. In that respect it will be appreciated that it is desirable to pull out the rail system in the installation state of the support arrangement, in order to be able to pull the support element out relative to the housing. In a removed state in contrast it is desirable for the rail system to be blocked against being pulled out in order to prevent the rails of the rail system accidentally coming apart. In particular it is therefore necessary for the setting element to enable transfer of the locking element between its free position and its blocking position if the support arrangement is in the orientation of use.

According to a preferred configuration of the invention the locking element is mounted to the support arrangement rotatably about an axis of rotation, wherein preferably the locking element and the setting element are rotatable about the same axis of rotation. In that way the locking element can be particularly easily transferred between its blocking position and its free position. In that way the setting element can also be easily transferred between its rest position and its supporting position. In that respect it is preferably provided that the locking element and the setting element are rotable independently of each other. In particular that makes it possible for the locking element, when the setting element is in its rest position, to be still transferred between its blocking position and its free position. It is also conceivable that the locking element and the setting element are rotatable about different axes of rotation, in which case the axes of rotation can be parallel or skewed.

An advantageous configuration of the invention provides that a centre of gravity of the locking element is arranged at a spacing from the axis of rotation at least when the support arrangement is in an orientation of use, wherein the support arrangement has its orientation of use at least when in its installation state. This advantageously provides that the locking element is independently rotatable in particular when an external force is acting, in particular the force of gravity. In particular when the support arrangement is in its orientation of use, it is desirable that the locking unit can be transferred between its rest state and its blocking state. In order in that case to implement the transfer which is effected independently of handling by the user, that is to say "automatically", it is particularly advantageous to bring about the transfer movement as a consequence of the force of gravity acting on the locking element. Particularly advantageously the locking element is in its blocking position when the support arrangement is in its orientation of use, caused solely by the action of the force of gravity. In that case the locking unit is consequently in its blocking state so that the rails of the rail system are not moveable relative to each other. With such a design configuration the locking element can be particularly easily moved into its free position by means of a force acting in opposition to the force of gravity, for example by means of direct or indirect abutment against the housing of the apparatus.

In the reversal orientation of the support arrangement in contrast transfer of the locking element from its blocking position into its free position is generally not wanted. The reason for this is that the rails are wanted to be pulled out relative to each other generally only when the support arrangement is in its installation state and accordingly in its orientation of use. The reversal orientation in contrast can typically not be implemented during the installation state of the support arrangement so that the fact that the support arrangement is in its reversal orientation implies the removed state. Consequently the rail system is generally to be prevented from being pulled out in the reversal orientation in order to safeguard the user of the apparatus from being obstructed as a consequence of the rails coming apart. It will be appreciated however that it is also possible for the locking element to be transferred into its free position intentionally even in the reversal orientation, for example as a consequence of applying a force by hand, in order thereby for example to facilitate cleaning the individual rails of the rail system.

A further feature of the invention provides that the locking element and the setting element have complementary positively locking regions so that when the setting element is in its supporting position it engages with the locking element providing a positively locking relationship. In that case a positively locking region of the setting element engages in positively locking relationship into the positively locking region of the locking element and thereby prevents the locking element from being transferred into its free state. In particular firm support for the locking element in the reversal orientation of the support arrangement is advantageous to support the locking element in that orientation in relation to the force of gravity acting thereon. That support is advantageously afforded by the formation of a positively locking relationship.

An advantageous configuration of the invention provides that that a centre of gravity of the setting element is arranged at a spacing from the axis of rotation, about which the setting element is rotatable, at least when the support arrangement is in a reversal orientation. This advantageously provides that the setting element is rotatable about the axis of rotation under the action solely of the force of gravity. In particular when the support arrangement is in its reversal orientation there is a wish to be able to transfer the setting element into its supporting position. In order in that case to produce such a transfer which is effected independently of handling by the user, that is to say "automatically", it is particularly advantageous to implement the transfer as a consequence of the force of gravity acting on the setting element. This provides that, when the support arrangement is in its reversal orientation, the rails cannot be pulled out and thus cannot represent any obstruction for the user or even a risk of injury to the user.

A particularly advantageous development of the apparatus according to the invention provides that the setting element is in the form of a part-circular ring extending around the axis of rotation. That can advantageously ensure that, in the course of the rotary movement, the setting element does not accidentally hit against adjoining components. In addition that makes it possible for the setting element to be of a particularly space-saving and compact configuration.

Preferably at least the locking element and preferably further the setting element is or are associated with a rail of the rail system. The locking element and the setting element are preferably associated with the same rail of the rail system.

A further configuration of the invention provides that the locking unit includes at least one coupling element with which the locking element can cooperate in positively locking relationship, wherein preferably the locking element has a hook portion for engagement with the coupling element. The rails are blocked from being pulled out by means of the positively locking relationship between the locking element and the coupling element. In that case the locking element is in its blocking position. To enable the rails to be pulled out the positively locking relationship has to be disengaged by the locking element being moved into its free position. Withdrawal of the rails relative to each other can thus be blocked or enabled in dependence on the orientation and the state of the support arrangement.

In that respect it is particularly preferable if the coupling element is associated with another rail of the rail system than the locking element, wherein the coupling element is preferably arranged directly at the respective rail. That provides that the rail system is blocked against being pulled out, with the formation of the positively locking relationship between the coupling element and the locking element.

An advantageous configuration of the invention provides that the support arrangement includes at least one supporting element, by means of which the rail system can be placed on a supporting surface associated with the housing, preferably a side wall of the housing.

Advantageously the support arrangement can thus be mounted in the internal space in the apparatus. In that respect it is preferably provided that the supporting element is arranged at an underside of a rail.

According to a further feature of the invention it is provided that the setting element has at least one abutment portion by means of which the setting element can butt against an abutment at least when the support arrangement is in its installation state so that rotation, caused by the action of the force of gravity, of the setting element about n the axis of rotation beyond the rest position is blocked. In that way it is possible to ensure that transfer of the locking element from its free position into its blocking position is not blocked by the setting element as a consequence of an unwanted orientation on the part of the setting element. Thus it is possible to envisage for example that the setting element, as a consequence of a movement of the support arrangement, is unintentionally moved into a supporting position, in which the locking element can no longer be transferred into its free position or conversely not into its blocking position. Such a scenario is to be avoided. The abutment portion accordingly serves to prevent unwanted positions of the setting element, in particular when the support arrangement is in its orientation of use.

A further configuration of the invention provides that the abutment is on the supporting element. The supporting element thus performs a dual function. On the one hand the supporting element provides that, when the support arrangement is in its installation state, the rail system can butt against an abutment of the housing. On the other hand the supporting element prevents the setting element being rotatable beyond its rest position under the action of the force of gravity. Advantageously therefore this saves on a further component, and that is found to be particularly advantageous in particular in regard to costs and the weight of the support arrangement and the locking unit.

According to an advantageous embodiment of the invention it is provided that the apparatus has a receiving unit which is arranged in force-transmitting fashion on the housing and is suitable for receiving the support arrangement, wherein preferably the support arrangement can be placed on a supporting surface of the receiving unit. The receiving unit can be formed in particular by a plurality of bar-shaped struts which are connected together. Advantageously the supporting element of the support arrangement can cooperate with the receiving unit of the housing. In that respect it is preferably provided that the supporting element can be placed on the supporting surface of the receiving unit. In the case of an apparatus in the form of an oven the receiving unit for example is in the form of horizontal bars which are arranged in pair-wise relationship on the side walls of the oven and which are connected by vertical bars. In that case the receiving surface is preferably formed by a horizontal bar.

An advantageous configuration of the invention provides that the locking element has at least one abutment portion which projects beyond the support arrangement in such a way that the locking element can butt against the housing directly or indirectly in the course of transfer of the support arrangement in its installation state. That ensures that the locking element can be transferred from its blocking position into its free position without particular handling on the part of the user. That is made possible in particular by virtue of the fact that the abutment portion projects beyond the support arrangement and can thereby butt against the housing as soon as the user moves the support arrangement into its installation state while the support arrangement as such does not accidentally hit against the housing. Transfer of the locking element from its blocking position into its free position is accordingly implemented "automatically".

The present invention also includes a support arrangement with a locking unit arranged thereon, having the features as are described hereinbefore and recited in the accompanying claims. The support arrangement according to the invention with the locking unit thereon is provided and adapted for insertion and mounting in the internal space of an apparatus as is also described herein, preferably an oven or a steam cooker. Desirably the support arrangement has a pair of rail systems mounted on opposite sides of the support element. Further preferably each of the two rail systems has precisely one locking unit.

An embodiment of the invention is purely diagrammatically illustrated in the drawings and described in greater detail hereinafter. In the drawings.

An embodiment by way of example which is shown in FIGS. 1 to 5 concerns an apparatus 1 according to the invention, which in the present example is in the form of an oven for cooking foods. Such an apparatus 1 is shown by way of example in FIG. 1. The apparatus 1 has a cuboidal housing 3 which is formed by walls 2 and which includes an internal space 4. A wall 2 of the housing 3 which at the same time forms a front side 30 of the apparatus 1 is provided with a door 31. The apparatus 1 further has a receiving unit 24 arranged in the internal space 4 for receiving a support arrangement 5 according to the invention. The receiving unit 24 is arranged at two mutually opposite side walls 22 of the housing 3 and is formed by a plurality of metal horizontal bars 28 and vertical bars 32.

Figure 1:
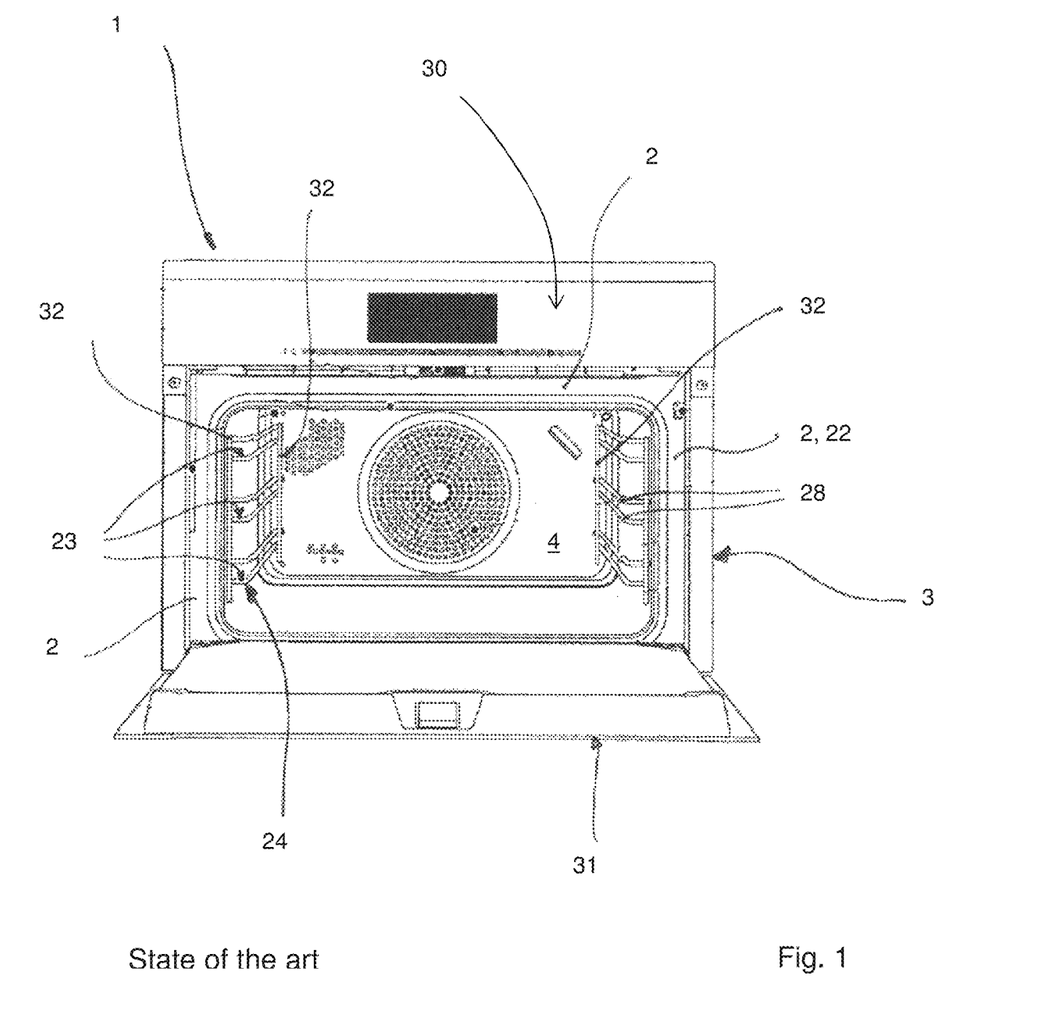
FIG. 1 shows a front view of an apparatus according to the invention.

In this arrangement the horizontal bars 28 are arranged as pairs thereof at a vertical spacing from each other at the side walls 22 of the housing 3 and are each of an L-shaped form. In that arrangement those horizontal bars 28 of the pair of bars, which is arranged beneath the horizontal bar 28 associated therewith, forms a supporting surface 23 for the support arrangement 5 while the upper horizontal bar 28 of the pair prevents the support arrangement 5 tilting as a consequence of assymmetircal loading of a respective support element. The horizontal bars 28 associated with a side wall 22 are fixed to two vertical bars 32. In this arrangement a respective vertical bar 32 is arranged at a rear wall 2 of the apparatus 1 while the other vertical bar 32 is arranged in a region towards the door 31 of the respective side wall 22.

In addition the apparatus 1 according to the invention includes a support arrangement 5 which is removable from the housing 3 and a locking unit 9, that are shown in FIGS. 2 to 5. In that respect the locking unit 9 is arranged on the support arrangement 5.

The support arrangement 5 has a rail system 6 and a support element which is not shown in the Figures. In this case the rail system 6 includes at least two interconnected rails 7, 8 which are moveable relative to each other. The apparatus 1 further includes middle rails 36 which are automatically involved by virtue of of being linked to the outer rails 7, 8. The support element can be for example in the form of a grill and can be adapted to receive the foods to be cooked. In addition the support arrangement 5 includes a supporting element 21 arranged on a rail 7 of the rail system 6. The support arrangement 5 can be placed on one of the supporting surfaces 23 of the receiving unit 24 by means of the supporting element 21. The support arrangement 5 can be transferred between an installation state in which it is mounted in the housing 3 and a removal state in which it is separated from the housing 3.

The locking unit 9 is arranged at that rail 7 of the support arrangement 5, to which the supporting element 21 of the support arrangement 5 is fixed. The locking unit 9 includes a locking element 10 and a setting element 11. The locking element 10 and the setting element 11 are here mounted to the rail 7 rotably about a common axis of rotation 12, with rotation of the two elements 10, 11 being possible independently of each other. The axis of rotation 12 is formed in this case by a rivet 33 on the rail 7. In addition the locking unit 9 includes a coupling element 19 arranged at the other of the two rails 8 of the rail system 6.

The locking element 10 has a positively locking region 14 corresponding to a positively locking region 15 of the setting element 11. The locking element 10 further has a hook portion 20 and an abutment portion 27. The abutment portion 27 here projects beyond the support arrangement 5. The locking element 10 can be transferred between a blocking position and a free position. In addition a centre of gravity 29 of the locking element 10 is arranged at a spacing 13 from the axis of rotation 12.

Besides the positively locking region 15 the setting element 11 also has an abutment portion 25. In this case the setting element 11 is in the form of a part-circular ring which extends around the axis of rotation 12 and which can be transferred between a rest position and a supporting position by virtue of its rotable mounting. A centre of gravity 17 of the setting element 11 is here also arranged at a spacing 18 from the axis of rotation 12.

Figure 2:
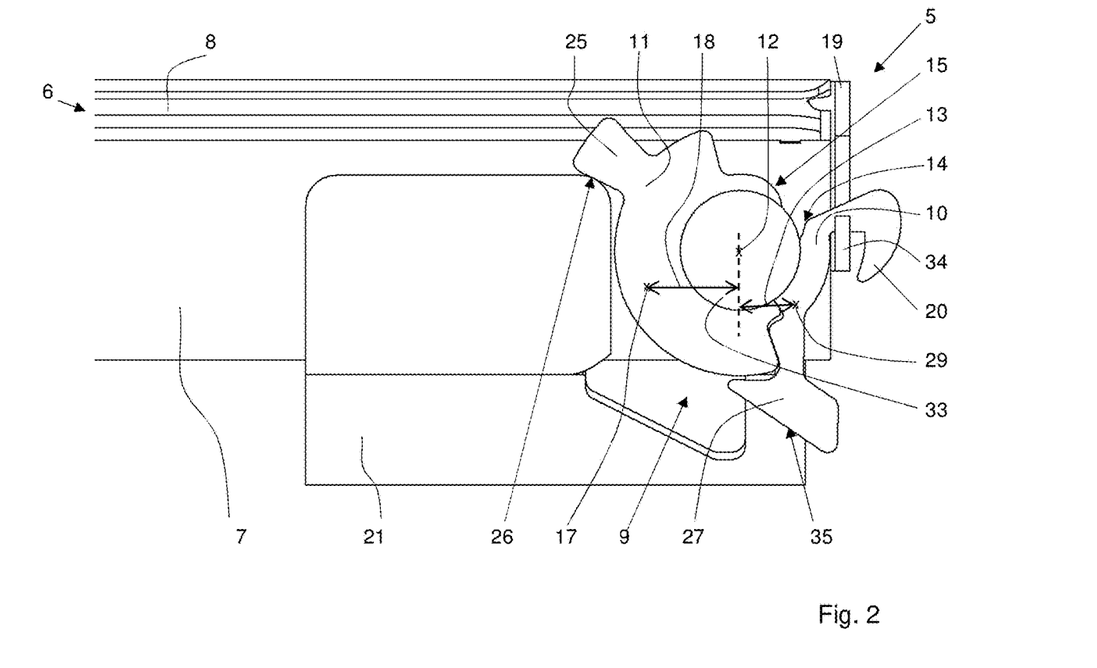
FIG. 2 shows a detail view of a support arrangement and a locking unit.

In the removed state of the support arrangement 5, shown in FIG. 2, the rails 7, 8 are blocked against being pulled out relative to each other by means of the locking unit 9 in the following fashion. Consequently the latter is in its blocking state:

By virtue of the centre of gravity 17 of the setting element 11 being arranged at a spacing 18 from the axis of rotation 12 the force of gravity exerts a turning moment about the axis of rotation 12, as a consequence of which the setting element 11 can be transferred into its rest position. In that case the abutment portion 25 of the setting element 11 bears against an abutment 26 formed by the supporting element 21 of the support arrangement 5. In that way rotation of the setting element 11 beyond the rest position, caused as a consequence of the action of the force of gravity, is blocked.

In its rest position the setting element 11 does not prevent transfer of the locking element 10 between its free position and its blocking position. That is possible in particular by virtue of the locking element 10 being mounted rotatably independently of the rotation of the setting element 11.

In the removed state of the support arrangement 5 the locking element 10 is in its blocking position. In that case, as a result of the force of gravity acting on the locking element 10, and by virtue of the centre of gravity 29 being arranged at a spacing 13 from the axis of rotation 12, the locking element 10 is rotated about the axis of rotation 12. In that case the hook portion 20 of the locking element 10 engages positively lockingly into the coupling element 19 and ends the rotary movement of the locking element 10. The coupling element 19 has a corresponding hook portion 34 for that purpose. By virtue of the arrangement of the two elements 10, 19 at different rails 7, 8 of the rail system 6 the rails 7, 8 are blocked against being pulled out relative to each other as a consequence of the positively locking connection.

Figure 3:
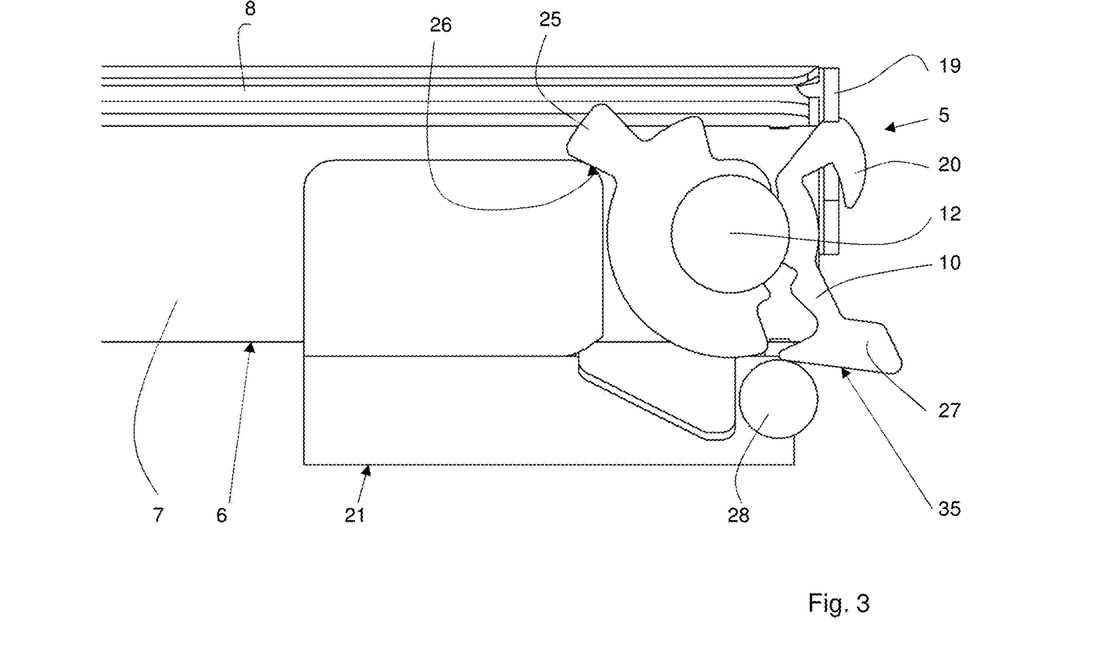
FIG. 3 is like FIG. 2, the locking unit being in a free state.
Figure 4:
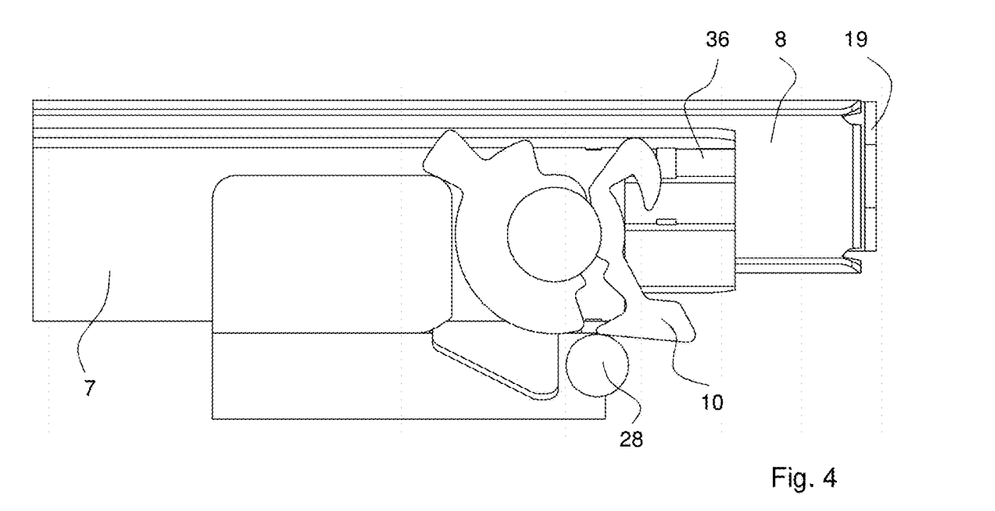
FIG. 4 is like FIG. 3, with a rail system of the support arrangement being pulled out.

In an installation state of the support arrangement 5, as shown in FIG. 3, the rails 7, 8 are in contrast free to be pulled out. The locking unit 9 is accordingly in its free state. In the course of transferring the support arrangement 5 from its removal state into its installation state the abutment portion 27 of the locking element 10, that projects beyond the support arrangement 5, as shown in FIG. 3, bears against the part of the upper horizontal bar 28, that extends parallel to the front side 30 of the housing 3. The abutment portion 27 of the locking element 10 has a bevelled contact surface 35 so that the locking element 10 is moved upwardly against the force of gravity in the course of installation of the support arrangement 5 in the housing 3. That removes the positively locking coupling of the hook portion 20 of the locking element 10 to the coupling element 19. As shown in FIG. 4 therefore the rail 8 provided with the coupling element 19 can be displaced relative to the rail 7 which is provided with the locking element 10.

The above-described blocking in respect of the rail system 6 being pulled out in a removal state of the support arrangement 5 is described for an orientation of use of the support arrangement 5. The orientation of use is distinguised in that the support arrangement 5 is usually employed in that orientation for cooking foods.

Figure 5:
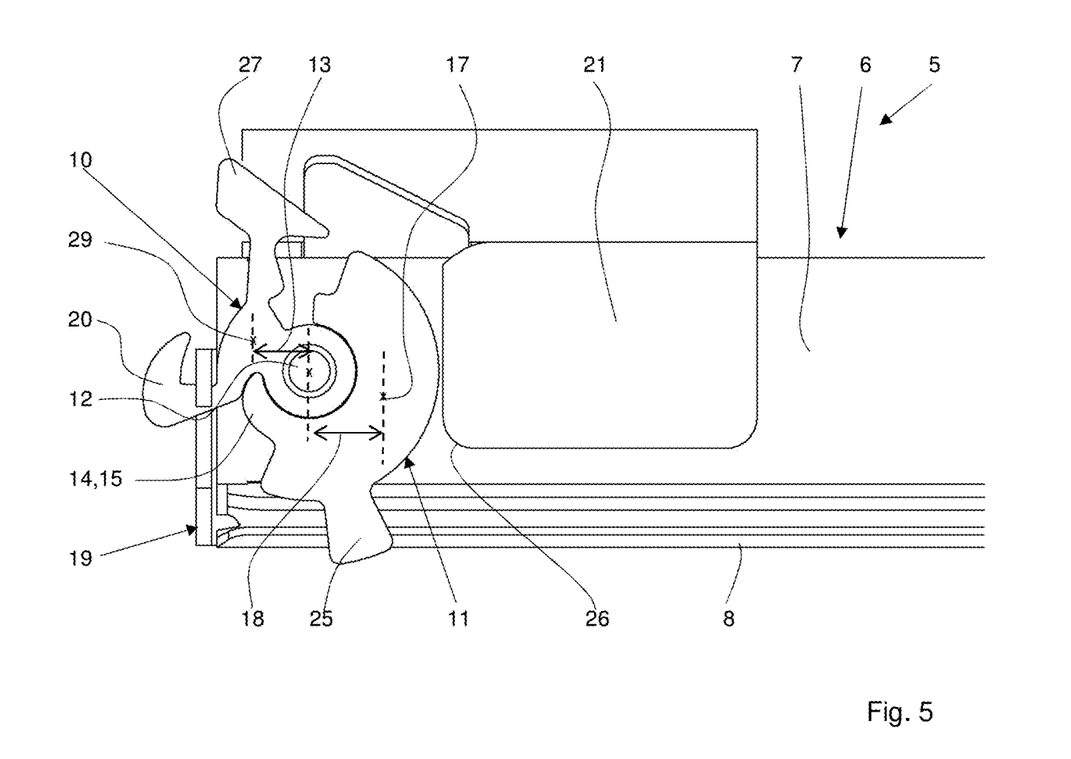
FIG. 5 is like FIG. 2, with the support arrangement in a reversal orientation.

In a reversal orientation in contrast, as shown in FIG. 5 in which the support arrangement 5 is turned through 180° about a horizontal relative to the orientation of use securing of the rail system 6 is implemented in the following way: by virtue of the arrangement of the centre of gravity 17 of the setting element 11 at a spacing 18 relative to the axis of rotation 12, this provides that, when the support arrangement 5 is rotated as a consequence of the rotatable mounting thereof on the rail 7, the setting element 11 is rotated caused by a turning moment produced as a consequence of the force of gravity. In a state of the setting element 11, in which it is turned relative to the rest position, the setting element 11 is in its supporting state. In particular the abutment portion 25 is no longer in contact with the supporting element 21. In the supporting state of the setting element 11 it engages by means of the complementary positively locking regions 14, 15 with the locking element 10, thereby constituting a positively locking relationship, wherein in the course of transfer of the setting element 11 from its rest position into its supporting position the positively locking region 15 of the setting element 11 is as it were moved "upwardly" against the direction in which the force of gravity acts. As a result the setting element 11 holds the locking element 10 against the force of gravity acting on the locking element 10, in the blocking position thereof, and thereby prevents the locking element 10 from turning and accordingly prevents movement thereof "downwardly". The latter would have the result that the positively locking connection of the locking element 10 to the coupling element 19 would be released, which basically would not be wanted when the support arrangement 5 is in its reversal direction. Instead the hook portion 20 of the locking element 10—similarly to the orientation of use—engages with the coupling element 19 and as is wanted blocks the rails 7, 8 from being pulled out relative to each other. The locking unit 9 consequently is in its blocking state.

LIST OF REFERENCES

1 apparatus
2 wall
3 housing
4 internal space
5 support arrangement
6 rail system
7 rail
8 rail
9 locking unit
10 locking element
11 setting element
12 axis of rotation
13 spacing
14 positively locking region
15 positively locking region
17 centre of gravity
18 spacing
19 coupling element
20 hook portion
21 supporting element
22 side wall
23 supporting surface
24 receiving unit
25 abutment portion
26 abutment
27 abutment portion
28 horizontal bar
29 centre of gravity
30 front side
31 door
32 vertical bar
33 rivet
34 hook portion
35 contact surface
36 rail

The invention claimed is:

1. A support arrangement for an apparatus for cleaning, storing or cooking items, the apparatus including a housing which is formed by walls and by which an internal space is spatially enclosed,
wherein the support arrangement includes at least one rail system having at least two rails which are connected together and which are moveable relative to each other and at least one support element,
wherein at least one locking unit arranged at the support arrangement is provided, which the locking unit includes at least one locking element which can be transferred between a blocking position and a free position,
wherein when the support arrangement is in its installation state in which the support arrangement is mounted to the housing the locking unit is in its free state in which the locking element enables extension of the rail system,
wherein when the support arrangement is in its removed state in which the support arrangement is separated from the housing the locking unit is in its blocking state in which the locking element blocks extension of the rail system with the formation of a positively locking relationship,
wherein the locking unit has a setting element cooperating with the locking element,
wherein the setting element is mounted to the support arrangement rotably about a first axis of rotation so that the setting element can be transferred between a rest position and a supporting position,
wherein, when in its supporting position the setting element holds the locking element in the blocking position thereof against the action of the force of gravity.

2. The support arrangement according to claim 1, wherein, when the setting element is in its rest position, it enables transfer of the locking element between its free position and its blocking position.

3. The support arrangement according to claim 1, wherein the locking element is mounted to the support arrangement rotatably about a second axis of rotation, wherein the first axis of rotation and the second axis of rotation the same axis of rotation or about different axes of rotation.

4. The support arrangement according to claim 3, wherein the centre of gravity of the locking element is arranged at a spacing from the second axis of rotation.

5. The support arrangement according to claim 1, wherein the locking element and the setting element have complementary positively locking regions so that when the setting element is in its supporting position it engages with the locking element providing a positively locking relationship.

6. The support arrangement according to claim 1, wherein the centre of gravity of the setting element is arranged at a spacing from the first axis of rotation.

7. The support arrangement according to claim 1, wherein the setting element is in the form of a part-circular ring extending around the axis of rotation.

8. The support arrangement according to claim 1, wherein the locking element is associated with a rail of the rail system or the locking element and the setting element are both associated with a rail of the rail system.

9. The support arrangement according to claim 1, wherein the locking unit includes at least one coupling element with which the locking element can cooperate in positively locking relationship, wherein the locking element has a hook portion for engagement with the coupling element.

10. The support arrangement according to claim 9, wherein the coupling element is associated with another rail of the rail system than the locking element, wherein the coupling element is directly at the respective rail.

11. The support arrangement according to claim 1, wherein the support arrangement includes at least one supporting element, by means of which the rail system can be placed on a supporting surface associated with the housing.

12. The support arrangement according to claim 1, wherein the setting element has at least one abutment portion by means of which the setting element can butt against an abutment at least when the support arrangement is in its installation state so that rotation, caused by the action of the force of gravity, of the setting element about the axis of rotation beyond the rest position is blocked.

13. The support arrangement according to claim 1, wherein a receiving unit is arranged in force-transmitting fashion on the housing and is suitable for receiving the support arrangement, wherein the support arrangement can be placed on the supporting surface of the receiving unit.

14. The support arrangement according to claim 1, wherein the locking element has at least one abutment portion which projects beyond the support arrangement in such a way that the locking element can butt against the housing directly or indirectly in the course of transfer of the support arrangement in its installation state.

15. An apparatus for cleaning, storing or cooking items, the apparatus including a housing which is formed by walls and by which an internal space is spatially enclosed and a support arrangement with a locking unit arranged on the support arrangement according to claim 1.

* * * * *